United States Patent
Hoefel et al.

(10) Patent No.: US 9,222,352 B2
(45) Date of Patent: Dec. 29, 2015

(54) CONTROL OF A COMPONENT OF A DOWNHOLE TOOL

(75) Inventors: Albert Hoefel, Sugar Land, TX (US); Francois Bernard, Houston, TX (US); Kent David Harms, Richmond, TX (US); Sylvain Ramshaw, Sugar Land, TX (US); Shayan Darayan, Sugar Land, TX (US); Taylor Johnson, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 675 days.

(21) Appl. No.: 13/299,107

(22) Filed: Nov. 17, 2011

(65) Prior Publication Data
US 2012/0152533 A1 Jun. 21, 2012

Related U.S. Application Data

(60) Provisional application No. 61/415,006, filed on Nov. 18, 2010.

(51) Int. Cl.
- *E21B 49/08* (2006.01)
- *E21B 47/10* (2012.01)
- *G05D 7/06* (2006.01)

(52) U.S. Cl.
CPC ............... *E21B 49/088* (2013.01); *E21B 47/10* (2013.01); *G05D 7/0635* (2013.01)

(58) Field of Classification Search
CPC ....... E21B 49/081; E21B 49/10; E21B 47/10; E21B 49/088; G05D 7/0635
USPC ............. 166/66, 264, 250.01; 700/282; 73/152.21, 152.28, 152.31, 152.34, 73/152.48, 152.59
See application file for complete search history.

(56) References Cited

U.S. PATENT DOCUMENTS

| | | |
|---|---|---|
| 3,934,468 A | 1/1976 | Brieger |
| 4,860,581 A | 8/1989 | Zimmerman et al. |
| 4,893,505 A | 1/1990 | Marsden et al. |
| 4,936,139 A | 6/1990 | Zimmerman et al. |
| 4,941,951 A * | 7/1990 | Sheppard et al. ............... 175/48 |
| 5,622,223 A | 4/1997 | Vasquez |
| 5,799,733 A | 9/1998 | Ringgenberg et al. |
| 6,237,404 B1 | 5/2001 | Crary et al. |
| 7,114,562 B2 | 10/2006 | Fisseler et al. |
| 7,543,659 B2 | 6/2009 | Partouche et al. |
| 7,594,541 B2 | 9/2009 | Ciglenec et al. |
| 7,805,247 B2 | 9/2010 | Hsu et al. |
| 7,937,223 B2 | 5/2011 | Ciglenec et al. |
| 7,967,081 B2 | 6/2011 | Sugiura et al. |
| 8,004,421 B2 | 8/2011 | Clark |

(Continued)

OTHER PUBLICATIONS

Johnson, Taylor et al., "Turbo-alternator stalling protection using available-power estimate", IEEE Power and Energy Conference at Illinois, Feb. 25-26, 2011, pp. 1-6.

*Primary Examiner* — Nicole Coy
*Assistant Examiner* — Kristyn Hall
(74) *Attorney, Agent, or Firm* — Kenneth L. Kincaid (57) ABSTRACT

An apparatus including a downhole tool for conveyance in a wellbore extending into a subterranean formation and method of use thereof. The downhole tool may include a turbo-alternator disposed in a passageway for drilling mud, and a controller to: track operating points of the turbo-alternator, determine from the operating points a flow rate of the drilling mud, and control a component of the downhole tool based on the flow rate.

18 Claims, 4 Drawing Sheets

(56) References Cited

U.S. PATENT DOCUMENTS

| | | |
|---|---|---|
| 8,111,171 B2 | 2/2012 | Clark |
| 8,121,788 B2 | 2/2012 | Bordakov et al. |
| 8,429,962 B2 | 4/2013 | Zazovsky et al. |
| 8,474,485 B2 | 7/2013 | Harms et al. |
| 8,502,696 B2 | 8/2013 | Clark |
| 2008/0156486 A1* | 7/2008 | Ciglenec et al. ............ 166/264 |
| 2009/0166085 A1 | 7/2009 | Ciglenec et al. |
| 2010/0006341 A1 | 1/2010 | Downton |
| 2010/0122882 A1* | 5/2010 | Komorowski et al. ......... 192/35 |
| 2010/0175925 A1 | 7/2010 | Ciglenec et al. |
| 2010/0201540 A1 | 8/2010 | Li et al. |
| 2010/0243265 A1* | 9/2010 | Sherrill et al. ............... 166/373 |
| 2011/0276187 A1 | 11/2011 | Ciglenec et al. |
| 2012/0013481 A1 | 1/2012 | Clark |
| 2012/0014219 A1 | 1/2012 | Clark |
| 2012/0145462 A1 | 6/2012 | Leising et al. |
| 2012/0152533 A1 | 6/2012 | Hoefel et al. |
| 2012/0160563 A1 | 6/2012 | Clark et al. |
| 2012/0160565 A1 | 6/2012 | Downton et al. |
| 2013/0022476 A1 | 1/2013 | Villareal et al. |
| 2013/0047696 A1 | 2/2013 | Rasmus et al. |
| 2013/0048380 A1 | 2/2013 | Rasmus et al. |
| 2013/0054146 A1 | 2/2013 | Rasmus et al. |
| 2013/0090854 A1 | 4/2013 | Rasmus et al. |
| 2013/0090855 A1 | 4/2013 | Rasmus et al. |
| 2013/0204534 A1 | 8/2013 | Anand et al. |
| 2013/0301389 A1 | 11/2013 | Alford et al. |

\* cited by examiner

CONTROL OF A COMPONENT OF A DOWNHOLE TOOL

This application claims the benefit of U.S. Provisional Application No. 61/415,006, entitled "Control of a Downhole Sampling-While-Drilling Pump," filed on Nov. 18, 2010, which is incorporated herein by reference in its entirety.

BACKGROUND OF THE DISCLOSURE

Some downhole tools (e.g., well logging tools) include one or more devices that measure various properties of the subterranean fluids and/or perform certain mechanical acts with a sampling or other downhole tool. To accomplish the aforementioned operations, a control signal may be transmitted from the surface to the downhole tool. Inability to immediately communicate a control signal to the downhole tool can result in inefficiencies, time delays, and expenses associated with a drilling operation in a wellbore.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Wells are drilled into the ground or an ocean bed to recover natural deposits of oil and gas, as well as other desirable materials that are trapped in geological formations in the Earth's crust. A well is drilled using a drill bit attached to the lower end of a "drill string." Drilling fluid, or "mud," is pumped down through the drill string to the drill bit. The drilling fluid lubricates and cools the drill bit, and it carries drill cuttings back to the surface in the annulus between the drill string and a wall of the wellbore or borehole.

For oil and gas exploration, it is beneficial to have information about the subterranean formations (or formation(s)) that are penetrated by a wellbore. For example, one area of subterranean formation evaluation relates to the measurements of the formation pressure and formation permeability. These measurements assist with the prediction of production capacity and production lifetime of a subterranean formation.

One technique for measuring formation properties includes lowering a "wireline" tool into the well to measure formation properties. A wireline tool may be a measurement tool that is suspended from a wire as it is lowered into a wellbore so that is can measure formation properties at desired depths. A wireline tool may include a probe that may be pressed against the wall of the wellbore to establish fluid communication with the formation. This type of wireline tool is often called a "formation tester." Using the probe, a formation tester measures the pressure of the formation fluids and generates a pressure pulse that is used to determine the formation permeability. The formation tester tool may also withdraw a sample of the formation fluid for later analysis.

In order to use a wireline tool, whether the tool be a resistivity, porosity or formation testing tool, the drill string is removed from the wellbore so that the tool can be lowered into the wellbore. This is called a "trip" downhole. Further, the wireline tools are lowered to a zone of interest, generally at or near the bottom of the wellbore. A combination of removing the drill string and lowering the wireline tools downhole are time-consuming measures and can take up to several hours, depending upon the depth of the wellbore. Due to the expense and rig time to "trip" the drill pipe and lower the wireline tools down the wellbore, wireline tools may be used when the information is desired or when the drill string is tripped for another reason, such as changing the drill bit. Examples of wireline formation testers are described, for example, in U.S. Pat. Nos. 3,934,468, 4,860,581, 4,893,505, 4,936,139 and 5,622,223, which are incorporated herein by reference in their entireties.

In another approach, techniques for measuring formation properties using tools and devices that are positioned near the drill bit in a drilling system have been developed. Thus, formation measurements are made during the drilling process and the terminology generally used in the art is measurement-while-drilling ("MWD") and logging-while-drilling ("LWD"). A variety of downhole MWD and LWD drilling tools are available. Further, formation measurements can be made in tool strings which do not include a drill bit a lower end thereof, but which are used to circulate mud in the wellbore.

Measurement-while-drilling may refer to measuring the drill bit trajectory as well as wellbore temperature and pressure, while logging-while-drilling may refer to measuring formation parameters or properties, such as resistivity, porosity, permeability, and sonic velocity, among others. Real-time data, such as the formation pressure, allows an operator to make decisions about drilling mud weight and composition, as well as decisions about drilling rate and weight-on-bit, during the drilling process.

Formation evaluation while drilling tools capable of performing various downhole formation testing may include a small probe or pair of packers that can be extended from a drill collar to establish hydraulic coupling between the formation and pressure sensors in the tool so that the formation fluid pressure may be measured. Some known tools use a pump to actively draw a fluid sample out of the formation so that it may be stored in a sample chamber in the tool for later analysis. Such a pump may be powered by a turbine in the drill string that is driven by the mud flow down the drill string.

However, control of a fluid sampling operation in any formation testing tool, either of wireline or MWD, is beneficial to achieve acceptable performance. Further, at large depths, substantial hydrostatic pressure and high temperatures are present thereby further complicating matters. Still further, formation testing tools are operated under a wide variety of conditions and parameters that are related to both the formation and the drilling conditions.

In an embodiment, a fluid pump system for a downhole tool connected to a pipe string positioned in a wellbore penetrating a subterranean formation is disclosed. The system includes a pump that is in fluid communication with at least one of the formation and the wellbore, and that is powered by mud flowing downward through the pipe string. The pump is linked to a controller which controls the pump speed based upon a mud volumetric flow rate determined from a turbine angular velocity (revolutions per minute, "rpm") and a load on an alternator coupled to the turbine, such as a load power or current.

In another embodiment, a method for operating a pump system for a downhole tool connected to a pipe string positioned in a wellbore penetrating a subterranean formation is disclosed. The method includes rotating a turbine disposed in the wellbore with mud flowing downward through the pipe string, obtaining a load power or current from an alternator coupled to the turbine, operating a sampling pump with the power from the alternator, measuring a speed of the turbine and a load on the alternator to determine a mud flow rate value, and controlling a sampling pump based on the mud flow rate.

This disclosure relates to fluid pumps and sampling systems described below that may be used in a downhole drilling environment, such as the one illustrated in FIG. 1. In some refinements, this disclosure relates to methods for using and controlling the disclosed fluid pumps. In one or more refinements, a formation evaluation while drilling tool includes an improved fluid pump and an improved method of controlling the operation of the pump.

Those skilled in the art given the benefit of this disclosure will appreciate that the disclosed apparatuses and methods have application during operation other than drilling. While this disclosure relates to sampling, the disclosed apparatus and method can be applied to other operations including injection techniques.

The phrase "formation evaluation while drilling" refers to various sampling and testing operations that may be performed during the drilling process, such as sample collection, fluid pump out, pretests, pressure tests, fluid analysis, and resistivity tests, among others. It is noted that "formation evaluation while drilling" is not limited to taking measurements while the drill bit is actually cutting through the formation. For example, sample collection and pump out may be performed during brief stops in the drilling process. That is, the rotation of the drill bit is briefly stopped so that the measurements may be made. Drilling may continue once the measurements are made. Even in embodiments where measurements are made after drilling is stopped, the measurements may still be made without having to trip the drill string.

In this disclosure, "hydraulically coupled" is used to describe bodies that are connected in such a way that fluid pressure may be transmitted between and among the connected items. The term "in fluid communication" is used to describe bodies that are connected in such a way that fluid can flow between and among the connected items. It is noted that "hydraulically coupled" may include certain arrangements where fluid may not flow between the items, but the fluid pressure may nonetheless be transmitted. Thus, fluid communication is a subset of hydraulically coupled.

Figure 1:
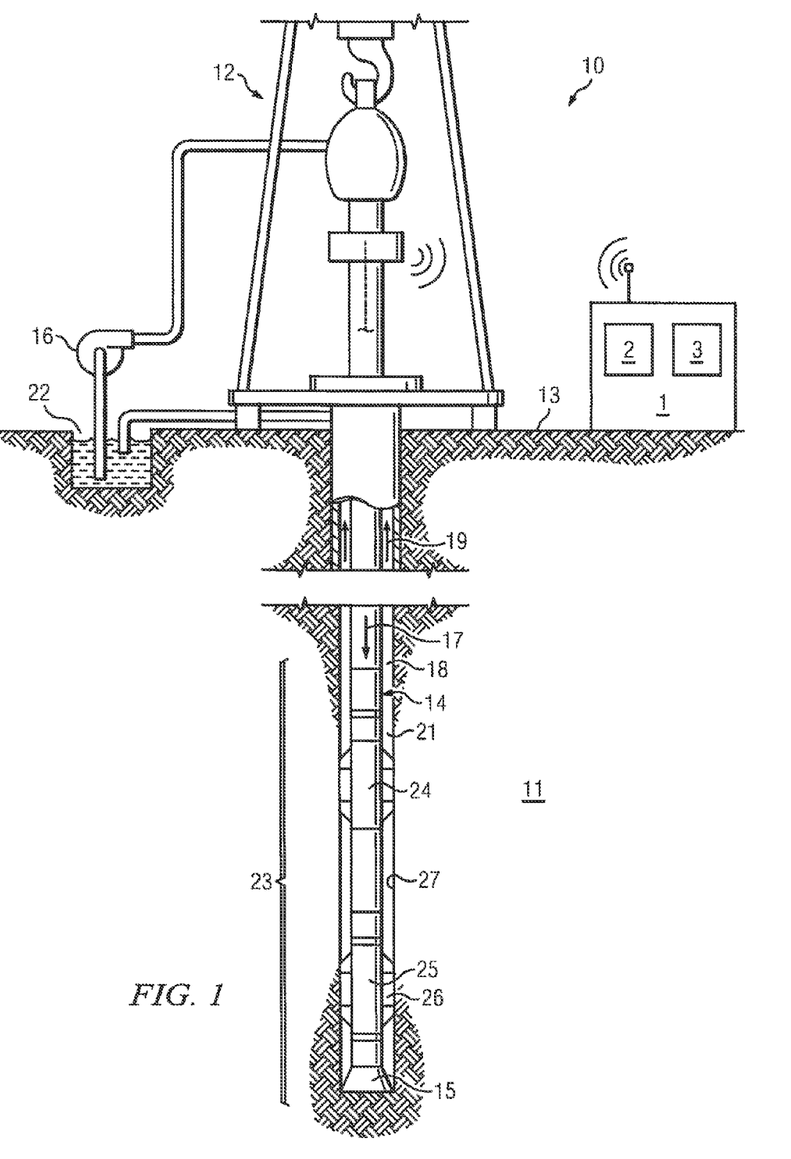
FIGS. 1 to 4 are schematic views of apparatus or portions thereof according to one or more aspects of the present disclosure.

FIG. 1 illustrates a drilling system 10 used to drill a well through subterranean formations (or formation(s)), shown generally at 11. A drilling rig 12 at the surface 13 is used to rotate a drill string 14 that includes a drill bit 15 at its lower end. As the drill bit 15 is being rotated, a "mud" pump 16 is used to pump drilling fluid, commonly referred to as "mud" or "drilling mud," downward through the drill string 14 in the direction of the arrow 17 to the drill bit 15. The mud, which is used to cool and lubricate the drill bit 15, exits the drill string 14 through ports (not shown) in the drill bit 15. The mud then carries drill cuttings away from the bottom of the wellbore 18 as it flows back to the surface 13 as shown by the arrow 19 through an annulus 21 between the drill string 14 and the formation 11. While a drill string 14 is shown in FIG. 1, it will be noted here that this disclosure is also applicable to work strings and pipe strings as well.

At the surface 13, the return mud is filtered and conveyed back to a mud pit 22 for reuse. The lower end of the drill string 14 includes a bottom-hole assembly ("BHA") 23 that includes the drill bit 15, as well as a plurality of drill collars 24, 25 that may include various instruments, such as LWD or MWD sensors and telemetry equipment. A formation evaluation while drilling instrument may, for example, be also included or be disposed within a centralizer or stabilizer 26.

The stabilizer 26 comprises blades that are in contact with a wall 27 of the wellbore 18 as shown in FIG. 1 to reduce a "wobble" of the drill bit 15. "Wobble" is the tendency of the drill string 14, as it rotates, to deviate from the vertical axis of the wellbore 18 and cause the drill bit 15 to change direction. A stabilizer 26 may already be in contact with the wall 27 of the wellbore 18, thus, reducing an extension of a probe to establish fluid communication with the formation 11. Of course, a probe may be disposed in locations other than in a stabilizer 26.

The drilling system further includes power equipment (not shown) for generating electrical power to the drill string 14. Additionally, a control system 1 is communicatively coupled to the drill string 14 and bottom hole assembly 23 for overall control and for receiving, analyzing, and/or transmitting data. The control system 1 may include a processor 2 and a memory 3 to perform its intended functions.

Figure 2:
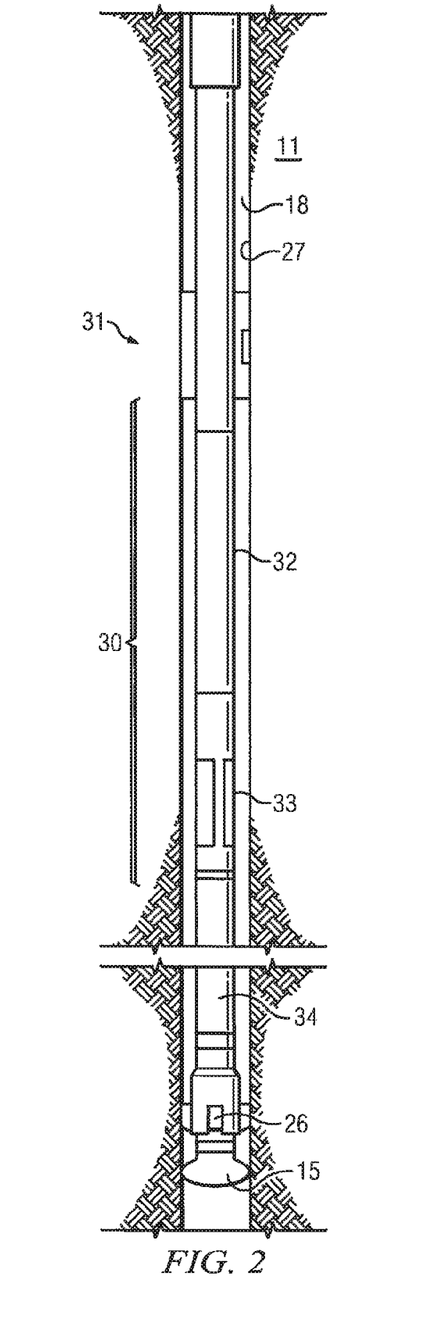

Turning to FIG. 2 and with continuing reference to FIG. 1, a downhole tool such as a fluid sampling tool 30 hydraulically connects to the subterranean formation 11 via a pressure testing tool 31. The pressure testing tool 31 comprises an extendable probe and resetting pistons as shown, for example, in U.S. Pat. No. 7,114,562, which is incorporated herein by reference in its entirety. The fluid sampling tool 30 includes a fluid description module and a fluid pumping module, both of which are disposed in a fluid pumping and analyzing module 32 and a sample collection module 33. Various other MWD tools or modules 34 may include resistivity tools, nuclear (porosity and/or density) tools, etc. The stabilizers 26 and the drill bit 15 are also shown in FIG. 2. It will be noted that the relative vertical placement of the tools or modules 31, 32, 33, 34 can vary and that the MWD modules 34 can be placed above or below the pressure testing tool 31 and the fluid pumping and analyzing module 32 as well as the fluid sample collection module 33 can also be placed above or below the pressure testing tool 31 or the MWD modules 34.

Figure 3:
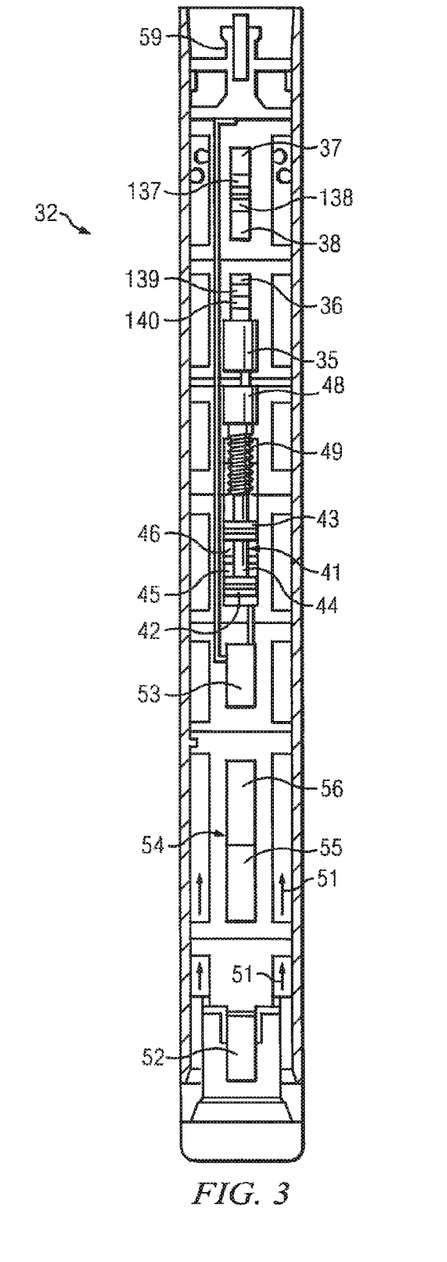
Figure 4:
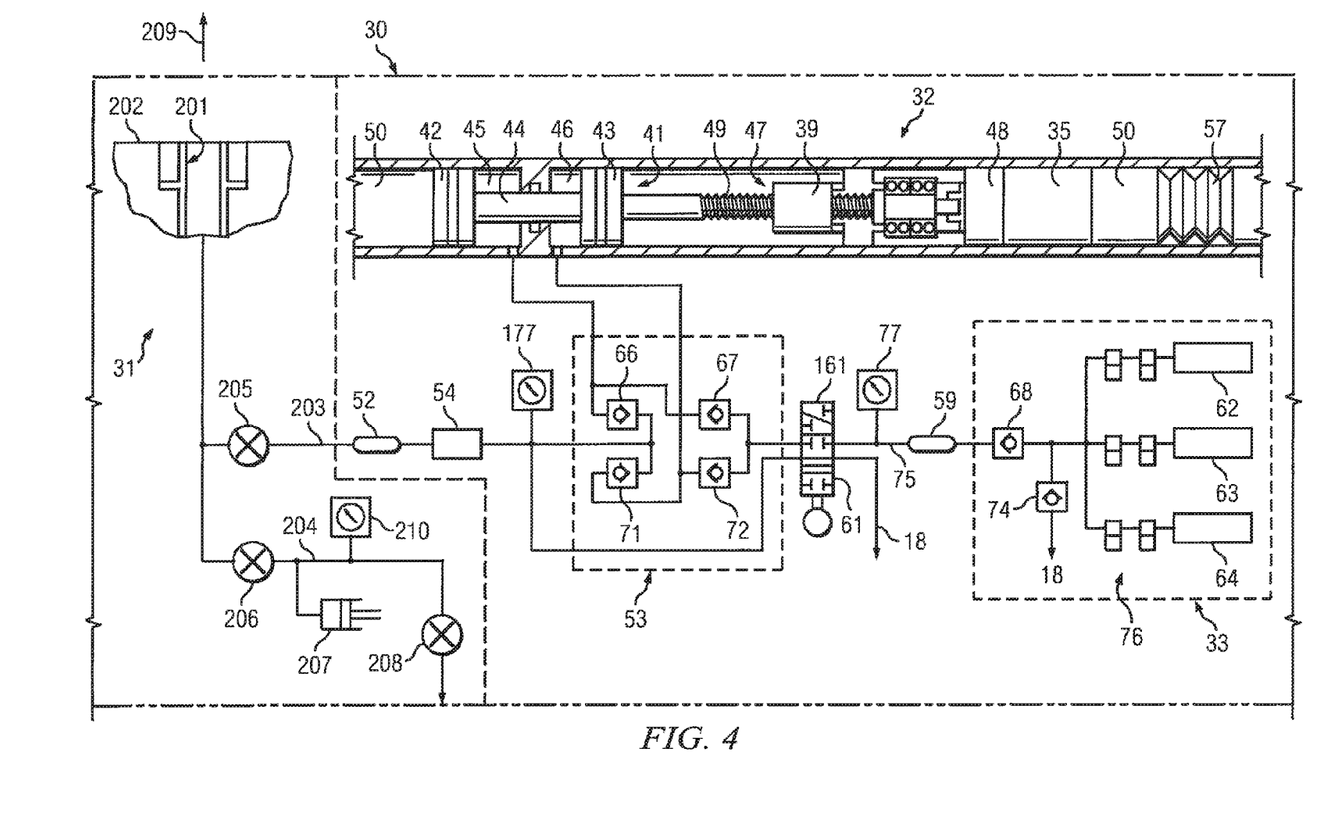

Turning to FIGS. 3 and 4, and with continuing reference to FIG. 2, a fluid pumping and analyzing module 32 is disclosed with adaptive control features. Various features disclosed in FIGS. 3 and 4 are used to adjust for changing environmental conditions in-situ. To cover a wide performance range, ample versatility is beneficial to run a pump motor 35 (e.g., a servo motor), together with electronics or a controller 36 and firmware for control. The controller 36 may include a processor 139 and memory 140 to perform its intended functions.

Power to the pump motor 35 is supplied from a turbine 37, which drives and an alternator 38 (the combination is a "turbo-alternator"). A sensor 137 is coupled to the turbine 37 to sense a turbine angular velocity (revolutions per minute, "rpm") thereof. Additionally, a sensor 138 is coupled to the alternator 38 to sense a load power or current thereof. A pump 41 includes two pistons 42, 43 connected by a pump shaft 44 and disposed within corresponding cylinders 45, 46, respectively. The dual piston 42, 43 and cylinder 45, 46 arrangement works through positive volume displacement. The motion of the pistons 42, 43 is actuated via a planetary roller-screw 47 (detailed in FIG. 4), which is connected to the pump motor 35 via a gearbox 48. The gearbox or transmission 48 driven by the pump motor 35 may be used to vary a transmission ratio between the motor shaft and the pump shaft 44. Also, the combination of the pump motor 35 and the alternator 38 may be used to vary the motion of the pump shaft 44.

The pump motor 35 may be part of or integral to the pump 41, but also may be a separate component. The planetary roller-screw 47 comprises a nut 39 and a threaded shaft 49. In an embodiment, the power of the pump 41 is at least 500 watts ("W"), which corresponds to about one kilowatt ("kW") at the alternator 38. In lieu of the planetary roller-screw 47 arrangement shown in FIG. 4, other means for fluid displacement may be employed such as lead screw or a separate hydraulic pump, which would output alternating high-pressure oil that could be used to reciprocate the dual piston 42, 43 and cylinder 45, 46 arrangement.

The plurality of arrows 51 in FIG. 3 indicate the flow of drilling mud through the fluid pumping and analyzing module 32, in a passageway in which the turbine 37 is provided. An extendable hydraulic/electrical connector 52 is used to connect the fluid pumping and analyzing module 32 to the pressure testing tool 31 and another extendable hydraulic/electrical connector 59 is used to connect the fluid pumping and analyzing module 32 to the sample collection module 33. Examples of connectors suitable for connecting collars can be found for example in U.S. Pat. No. 7,543,659, which is incorporated herein by reference in its entirety.

The downhole formation fluid enters the tool string through the pressure testing tool 31 and is routed to the fluid pumping and analyzing module 32 via the extendable hydraulic/electrical connector 52. At the fluid pumping and analyzing module 32, the fluid sample is initially pumped through the fluid identification unit 54. The fluid identification unit 54 comprises an optics module 55 together with other sensors (not shown), and a controller 56 to determine fluid composition (e.g., oil, water, gas, mud constituents) and properties (e.g., density, viscosity, resistivity). From the fluid identification unit 54, the fluid enters the fluid displacement unit ("FDU") or pump 41 via a set of valves in a valve block 53.

FIG. 4 also shows a probe 201 disposed, for example, in a blade 202 of the pressure testing tool 31. Two flow-lines 203, 204 extend from the probe 201. The flow-lines 203, 204 can be independently isolated by manipulating the sampling isolation valve 205 and/or a pretest isolation valve 206. The flow-line 203 connects the fluid pumping and analyzing module 32 to the probe 201 in the pressure testing tool 31. The flow-line 204 is used for "pretests."

During a pretest, the sampling isolation valve 205 to the fluid pumping and analyzing module 32 is closed, the pretest isolation valve 206 to a pretest piston 207 is open, and an equalization valve 208 is closed. The probe 201 is extended toward the formation as indicated by the arrow 209 and, when extended, is hydraulically coupled to the formation (not shown). The pretest piston 207 is retracted to lower the pressure in the flow-line 204 until the mud cake is breached. The pretest piston 207 is then stopped and the pressure in the flow-line 204 increases as it approaches the formation pressure. The formation pressure data can be collected during the pretest. The pretest can also be used to determine that the probe 201 and the formation are hydraulically coupled.

Through the valve block 53, the fluid gets routed to either one of the two displacement chambers or cylinders 45, 46. The pump 41 operates such that there is a displacement chamber 45, 46 drawing fluid in, while the other displacement chamber 45, 46 is expulsing fluid. Depending on the fluid routing by a fluid routing and equalization valve 61, the fluid exiting the pump 41 may be pumped back to the wellbore 18 (or wellbore annulus) or through the hydraulic/electrical connector 59 to one of sample chambers 62, 63, 64, which are located in the sample collection module 33 (see also FIG. 2). While three sample chambers 62, 63, 64 are shown, it will be noted that more or less than three chambers 62, 63, 64 may be employed.

The pumping action of the pistons 42, 43 is achieved via the planetary roller-screw 47, nut 39, and threaded shaft 49. The variable speed pump motor 35 and associated gearbox 48 drives the threaded shaft 49 in a bi-directional mode under the direction of the controller 36 shown in FIG. 3. Gaps between the components are filled with oil 50 and a bellows compensator 57 is provided as well.

During intake into the displacement chamber 45, fluid passes into the valve block 53 and past a check valve 66 before entering the displacement chamber 45. Upon output from the displacement chamber 45, fluid passes through a check valve 67 to the fluid routing and equalization valve 61 where it is either dumped to the wellbore 18 or passed through the hydraulic/electrical connector 59, a check valve 68 and into one of the sample chambers 62, 63, 64. Similarly, upon intake into the displacement chamber 46, fluid passes through a check valve 71 and into the displacement chamber 46. Upon output from the displacement chamber 46, fluid passes through a check valve 72, through the fluid routing and equalization valve 61 and either to the wellbore 18 or to the sample collector module 33.

During a sample collecting operation, fluid gets initially pumped to the fluid pumping and analyzing module 32 and exits the fluid pumping and analyzing module 32 via the fluid routing and equalization valve 61 or via a relief valve 74 to the wellbore 18. This action flushes the flow-line 75 from residual liquid prior to actually filling the sample chambers 62, 63, 64 with new or fresh formation fluid. Opening and closing of a sample chamber 62, 63, 64 is performed with sets of dedicated seal valves 76 which are linked to the controller 36 or other device. A pressure sensor 77 is, among other things, an indicative feature for detecting that the sample chambers 62, 63, 64 are full. The relief valve 74 is, among other things, a safety feature to avoid over pressuring the fluid in the sample chamber 62, 63, 64. The relief valve 74 may also be used to dump fluid to the wellbore 18.

Referring to FIGS. 1 and 3, the mud pump 16 assists with pumping mud through the drill string 14 during sampling operations. The pumping rates of the mud pump 16 are selected to ensure both MWD mud pulse telemetry communication back to surface as well as sufficient angular velocity for the turbine 37 to provide adequate power to the pump motor 35 for the pump 41.

At the start of the pumping operation and with reference to FIG. 4, the set pump drive parameters are updated according to an initial pumping operation, which takes place at the finish of the formation pressure test (the pretest) by the probe 201. At the start of the pumping operation, the flow-line 204 in the pressure testing tool 31 is at equilibrium with the formation pressure. The flow-line 203, which is leading to the sample collection module tool 33 is still closed off by the sample isolation valve 205 and filled with fluid under hydrostatic pressure. In order not to introduce pressure shocks to the formation, the pump 41 is operated prior to opening the flow-line 203 and the fluid routing and equalization valve 61 is operated to reduce the flow-line pressure in the lower portion of the flow-line 75 until it is equal to the formation pressure. Once this has occurred, the sample isolation valve 205 is opened, and communication to the pressure testing tool 31 is established to commence pumping. For example, at the beginning of sampling operations, the fluid routing and equalization valve 61 is actuated (i.e., the upper box 161 is active) and the pump 41 is activated until the pressure read by a pressure sensor 177 is equal to formation pressure, as read by the sensor 210 in the pressure testing tool 31. Then the sample isolation valve 205 is opened.

In addition to the measured formation/wellbore response to sampling by the fluid sampling and analyzing module 32, the fluid identification unit 54 may be used to provide feedback to an algorithm. The fluid identification unit 54 may provide optical densities at different wavelength that can be used for example to compute the gas oil ratio of the sampled fluid, to monitor the contamination of the drawn fluid by the mud filtrate, etc. Other uses include the detection of bubbles or sand in the flow-line that may be indicated by scattering of optical densities. For a better understanding of pumping systems and control schemes, see U.S. Pat. Nos. 7,594,541, 5,799,733, and 7,937,223 and U.S. Patent Application Pub. No. 2010/0175925, which are incorporated herein by reference in their entirety.

As described hereinabove, fluid sampling tools, and their pump(s), can be powered with a turbo-alternator coupled to the flow of drilling mud in the drill string. When a fluid sampling operation starts, the pumping rate of the fluid sampling tool is adapted to the formation and the formation fluid, as well as to the circulation rate of the drilling mud in the drill string. The control of the pumping rate may at least partially be performed by a control system at the surface capable of interacting with an operator and a controller downhole.

A system and method to control the pump (and the pumping rate) from measurements on the turbo-alternator in accordance with, for instance, a controller downhole is contemplated herein. The turbo-alternator measurements are processed to determine an available power and/or a turbine free-spin angular velocity. The pump motor is then controlled based on the processing results.

For example, the pump motor of the fluid sampling tool may be controlled so that a portion (e.g., 90%) of the available power from the turbo-alternator is used. Additionally, the pump motor of the fluid sampling tool may be controlled so that the pumping rate is a function of the turbine free-spin angular velocity. Thus, the pumping rate may be continuously changed by a controller downhole and/or a control system at the surface via variation of the circulation rate of the drilling mud. In another example, the processed turbine free-spin angular velocity is used to decode digital commands from the control system via modulation of the circulation rate of the drilling mud (downlinks). The two examples can be used successively. For example, an initial pumping rate of the fluid sampling tool may be continuously adjusted via variation of the circulation rate of the drilling mud, and then discrete adjustments of the pumping rate may be performed via modulation of the circulation rate of the drilling mud.

In a mode in which the pump motor is controlled so that a portion (e.g., 90%) of the available power is used, the circulation rate of the drilling mud can be reduced, and the erosion of the mud cake lining the wellbore by the drilling mud circulating back to the surface is thereby reduced. In a mode in which the processed turbine free-spin angular velocity is used to decode digital commands sent from the controller downhole and/or a control system, the decoding is robust, because the processed turbine free-spin angular velocity is less sensitive to the variations of load applied by the alternator to the turbine and is more sensitive to the modulations of the circulation rate initiated by the control system. It is also contemplated that an estimate of an available power and/or a turbine free-spin angular velocity for turbo-alternator may also be used. For a better understanding of a relationship between flow rates and the load and/or angular velocity of a turbo-alternator, see "Turbo-Alternator Stalling Protection: Estimating Available Power and Regulating Load," by Johnson, T. T. and Hoefel, A. E., presented at the Power and Energy Conference at Illinois (PECI) on 25-26 Feb. 2011, which is incorporated herein by reference in its entirety.

In a downhole sampling operation, the sampling rate of the downhole tool can be adjusted. The fluid initially sampled by the fluid sampling tool is contaminated by fluid used during drilling operations. Thus, an initial quantity of fluid is often sampled and then discarded. The rate at which fluid is pumped into the downhole sampling tool is controlled. If fluid is pumped too fast with the sampling pump, low pressures and turbulent flow can be created that induce bubbling and outgassing of various low molecular weight petroleum products from the fluid. The controller attempts to find a speed for the sampling pump that is as fast as possible to reduce the time for an accurate and reproducible sampling operation, while overcoming the negative impacts of operating too fast. It is also beneficial to operate the turbo-alternator that provides power for the downhole tool from the drilling mud at higher efficiency (e.g., 90% efficiency).

In a recognized process to control a pump such as a downhole sampling pump, commands are transmitted from the control system at the surface to the downhole tool using a drilling mud flow-rate pattern that has an extended duration in time. The flow rate of the drilling mud is controlled by surface operations to cross a flow-rate threshold of the downhole tool to generate a threshold-crossing pattern that is employed to control the downhole tool. A substantial period of time during which the flow rate of drilling mud is modulated is generally employed to produce a detectable pattern to control the downhole tool. It can take 10 to 30 minutes to control a downhole tool using a threshold-crossing method as described above, which can obstruct efficient downhole drilling operations.

The addition of another level of control for a downhole tool is provided by a controller that responds to a flow rate of the drilling mud, and employs the flow rate to control the downhole tool. The flow rate can be modulated to cause the downhole tool to enter a particular control mode. The circulation of the mud, therefore, can be more closely determined by sensing the angular velocity of the turbine (e.g., via a sensor 137 illustrated in FIG. 3) and a load on the alternator (e.g., via a sensor 138 illustrated in FIG. 3) and providing the information to the control system (e.g., control system 1 illustrated in FIG. 1) and/or a controller downhole (e.g., controller 36 illustrated in FIG. 3). The processor and memory of the control system and/or controller employ the aforementioned parameters to control how to operate a sampling pump.

The control system (e.g., control system 1 illustrated in FIG. 1) and/or controller (e.g., controller 36 illustrated in FIG. 3) may be implemented with one or a plurality of processors (see, e.g., the processor 2 of the control system 1 or the processor 139 of the controller 36) of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. The control system and/or controller may also include one or more memories (see, e.g., the memory 2 of the control system 1 or the memory 140 of the controller 36) of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory may include program instructions or computer program code that, when executed by an associated processor, enable the control system or controller to perform tasks as described herein. Additionally, any module such as the control system may also include a transceiver configured to allow the same to communicate with another system of a downhole tool.

The modules may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor. When power is applied to the control system or controller, it executes computer program code to control a sampling pump.

The downhole tool includes a turbo-alternator as described hereinabove to produce power for the downhole tool. The downhole tool further includes a sampling pump to sample fluids in the wellbore or the surrounding formation, and sensors to measure characteristics of the turbo-alternator. Signals produced by the sensors are transmitted to the control system and/or controller to determine how fast to operate the sampling pump, or what other command(s) should be transmitted within the downhole tool.

Flow rate of the drilling mud is controlled by surface operations. For example, a surface operator can adjust a speed of a mud pump or the opening of a mud control valve in response to signals transmitted from sensors in the downhole tool. The process to control the downhole tool includes sensing an angular velocity of the turbo-alternator and the load power or current drawn from the turbo-alternator. Examples of downhole tool processes that can be controlled include, without limitation, a sampling rate of fluid in the wellbore, retracting a probe of the downhole tool, and toggling between a sampling and a by-pass mode of operation for the downhole tool.

A pumping rate of a downhole tool can be controlled, for example, by configuring the downhole tool to enter a mode wherein the flow rate of the drilling mud sets a sampling rate of the tool that is linearly dependent on the flow rate of the drilling mud. For example, the downhole tool can be controlled so that a drilling mud flow rate of 400 gallons per minute ("GPM") could result in a sampling rate that is, for instance, 20% of an upper level. A drilling mud flow rate of 450 GPM could result in a linearly related sampling rate, for instance, 40% of an upper level. The result is the sampling rate of the downhole tool is adjusted by controlling the flow rate of the drilling mud from the mud pumps.

The downhole tool can convert the circulation rate of the drilling mud to control an available power from the turbo-alternator. In this manner, the sampling rate of the downhole tool is proportional to an available power from the turbo-alternator. As a further example, if the flow rate as controlled by surface operations is completely shut down, this can be interpreted by the controller in the downhole tool to take a sample and terminate operation.

As a further example, if the flow rate of the drilling mud is pumped below a particular circulation threshold, the downhole tool could be triggered to open a valve therein. As a further example, the downhole tool could be configured to shift a fluid routing valve from bypass mode to a sampling mode. The pumping rate of a fluid sampling tool could be controlled to operate within a specific range. Further examples of features of a downhole tool that could be controlled include, without limitation, opening/closing a bottle, retracting the tool, and toggling between sample and bypass modes.

Figure 5:
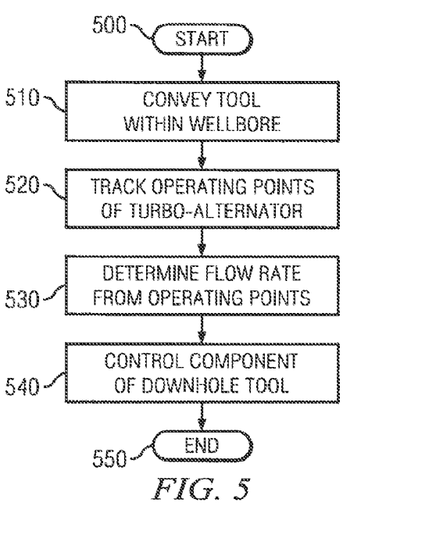
FIG. 5 is a flow chart of at least a portion of an embodiment of a method according to one or more aspects of the present disclosure.

Turning now to FIG. 5, illustrated is a flow chart of an embodiment of a method of operating a downhole tool according to one or more aspects of the present disclosure. The method begins in a module 500. In a module 510, a downhole tool is conveyed or disposed within a wellbore extending into a subterranean formation including a turbo-alternator in a passageway for drilling mud. In a module 520, operating points of the turbo-alternator are tracked (or sensed). The operating points of the turbo-alternator may include a load on the turbo-alternator and an angular velocity of the turbo-alternator. The load may be tracked via a sensor coupled to the alternator that senses a load (or output) current or power thereof. The angular velocity may be tracked by a sensor coupled to the turbine that senses the angular velocity (revolutions per minute) thereof.

In a module 530, a flow rate of the drilling mud is determined from the operating points in a module 530. Thereafter, a component of the downhole tool is controlled based on the flow rate in a module 540 and the method ends in a module 550. The component of the downhole tool may include a sampling pump powered by the turbo-alternator. In accordance therewith, a pumping rate of the sampling pump may be controlled. The control of the pumping rate of the sampling pump may include controlling the sampling pump to operate at a pumping rate proportional to the flow rate of the drilling mud.

Additionally, the electrical power level drawn by a sampling pump powered by the turbo-alternator may be controlled (e.g., changed). For instance, a pump motor (integral with or coupled to the sampling pump) may be controlled so that a portion (e.g., 90%) of the available power from the turbo-alternator is used to power the sampling pump. Also, the electrical power level drawn by the sampling pump may be controlled to be proportional to the flow rate. In another embodiment, the component may be a valve hosted in a downhole sampling tool and the method controls the valve by shifting a position of the valve. For instance, a position of one of the seal valves 76 may be shifted to open or close one of the sample chamber 62, 63, 64 of the sampling tools as illustrated and described with respect to FIG. 4.

In an embodiment, the method compares the flow rate to a threshold value and controls the component of the downhole tool based thereon. For instance, assuming threshold values of 400 GPM and 500 GPM, then the pumping rate of a sampling pump may be decreased if the flow rate determined in accordance with the operating points falls below 400 GPM and the pumping rate of a sampling pump may be increased if the flow rate determined in accordance with the operating points goes above 500 GPM. In another example, assuming the threshold value is 700 GPM, then the pumping rate of a sampling pump may be decreased if the flow rate determined in accordance with the operating points goes above 700 GPM.

In yet another embodiment, the method repeatedly determines from the operating points a plurality of flow rates of the drilling mud, detects a pattern in variations of the plurality of flow rates of the drilling mud, and controls (e.g., disables or enables) an operation of the component of the downhole tool based on the pattern. Thus, rather than determining a single flow rate of the drilling mud, the method continuously determines a plurality of fluid rates of the drilling mud to detect a pattern in variations of the plurality of flow rates. Once a pattern in variations of the flow rate is detected, the method in a preemptive manner can control a component of the downhole tool. The method as described herein may be performed by a controller. For instance, the modifications to the operation of a component (e.g., the sampling pump) can be controlled via a processor and memory (including a look-up table) in a controller coupled to the respective component.

As described herein, an apparatus including a downhole tool conveyable in a wellbore extending into a subterranean formation has been introduced. In an embodiment, the downhole tool includes a turbo-alternator disposed in a passageway for drilling mud, and a controller to track operating points (e.g., a load on and an angular velocity) of the turbo-alternator, determine from the operating points a flow rate of the drilling mud, and control a component of the downhole tool based on the flow rate. The component may be a sampling pump powered by the turbo-alternator and the controller controls the sampling pump by changing a pumping rate of the sampling pump based on (e.g., proportional to) the flow rate. The controller may also control the sampling pump by changing an electrical power level drawn by the sampling pump based on (e.g., proportional to) the flow rate. The component may also be a valve hosted in a downhole sampling tool and the controller controls the valve by shifting a position of the valve based on the flow rate.

The controller may also compare the flow rate to a threshold value and control the component of the downhole tool based thereon. The controller may repeatedly determine from the operating points a plurality of flow rates of the drilling mud, detect a pattern in the plurality of flow rates of the drilling mud, and control (e.g., disable or enable) an operation of the component of the downhole tool based on the pattern.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
    a downhole tool conveyable in a wellbore extending into a subterranean formation, the downhole tool comprising:
        a turbo-alternator disposed in a passageway for drilling mud;
        an angular velocity sensor coupled to the turbo-alternator, wherein the angular velocity sensor is configured to sense an angular velocity of the turbo-alternator;
        a load sensor coupled to the turbo-alternator, wherein the load sensor is configured to sense a load on the turbo-alternator; and
        a controller configured to receive information indicative of the angular velocity and load from the angular velocity sensor and load sensor, respectively, determine a flow rate value of the drilling mud by using the received information, and control a component of the downhole tool based on the flow rate value.

2. The apparatus of claim 1 wherein the component is a sampling pump powered by the turbo-alternator and the controller controls the sampling pump by changing a pumping rate of the sampling pump based on the flow rate value.

3. The apparatus of claim 2 wherein the controller controls the pumping rate of the sampling pump by controlling the sampling pump to operate at a pumping rate proportional to the flow rate value.

4. The apparatus of claim 1 wherein the component is a sampling pump powered by the turbo-alternator and the controller controls the sampling pump by changing an electrical power level drawn by the sampling pump based on the flow rate value.

5. The apparatus of claim 4 wherein the controller controls the electrical power level drawn by the sampling pump by controlling the sampling pump to draw the electrical power level proportional to the flow rate value.

6. The apparatus of claim 1 wherein the component is a valve hosted in a downhole sampling tool and the controller controls the valve by shifting a position of the valve based on the flow rate value.

7. The apparatus of claim 1 wherein the controller compares the flow rate value to a threshold value and controls the component of the downhole tool based thereon.

8. The apparatus of claim 1 wherein the controller repeatedly determines a plurality of flow rate values of the drilling mud by using the received information, detects a pattern in variations of the plurality of flow rate values of the drilling mud, and disables an operation of the component of the downhole tool based on the pattern.

9. The apparatus of claim 1 wherein the controller repeatedly determines a plurality of flow rate values of the drilling mud by using the received information, detects a pattern in variations of the plurality of flow rate values of the drilling mud, and enables an operation of the component of the downhole tool based on the pattern.

10. A method, comprising:
    disposing in a wellbore a downhole tool having a turbo-alternator disposed in a passageway for drilling mud;
    sensing an angular velocity of the turbo-alternator using an angular velocity sensor coupled to the turbo-alternator;
    sensing a load on the turbo-alternator using a load sensor coupled to the turbo-alternator;
    determining a flow rate value of the drilling mud by using information indicative of the angular velocity and load from the angular velocity sensor and load sensor, respectively; and controlling a component of the downhole tool based on the flow rate value.

11. The method of claim 10 wherein the component is a sampling pump powered by the turbo-alternator and controlling the sampling pump of the downhole tool comprises changing a pumping rate of the sampling pump based on the flow rate value.

12. The method of claim 11 wherein changing the pumping rate of the sampling pump comprises controlling the sampling pump to operate at a pumping rate proportional to the flow rate value.

13. The method of claim 10 wherein the component is a sampling pump powered by the turbo-alternator and controlling the sampling pump comprises changing an electrical power level drawn by the sampling pump based on the flow rate value.

14. The method of claim 13 wherein changing the electrical power level drawn by the sampling pump comprises controlling the sampling pump to draw the electrical power level proportional to the flow rate value.

15. The method of claim 10 wherein the component is a valve hosted in a downhole sampling tool and controlling the valve comprises shifting a position of the valve based on the flow rate value.

16. The method of claim 10 further comprising comparing the flow rate value to a threshold value and controlling the component of the downhole tool based thereon.

17. The method of claim 10 further comprising:
repeatedly determining a plurality of flow rate values of the drilling mud by using the received information;
detecting a pattern in variations of the plurality of flow rate values of the drilling mud; and
disabling an operation of the component of the downhole tool based on the pattern.

18. The method of claim 10 further comprising:
repeatedly determining a plurality of flow rate values of the drilling mud by using the received information;
detecting a pattern in variations of the plurality of flow rate values of the drilling mud; and
enabling an operation of the component of the downhole tool based on the pattern.

* * * * *